(12) United States Patent
Herold et al.

(10) Patent No.: US 6,184,274 B1
(45) Date of Patent: Feb. 6, 2001

(54) JOINTING COMPOUNDS WITH IMPROVED RESILIENCE

(75) Inventors: Hardy Herold, Burghausen (DE); Hendrikus Mosseveld, Krommenie (NL); Rita Kellermann, Burghausen (DE)

(73) Assignee: Wacker - Chemie GmbH, Munich (DE)

( * ) Notice: Under 35 U.S.C. 154(b), the term of this patent shall be extended for 0 days.

(21) Appl. No.: 09/009,392

(22) Filed: Jan. 20, 1998

(30) Foreign Application Priority Data

Feb. 6, 1997 (DE) .............................. 197 04 553

(51) Int. Cl.⁷ .................................................. C04B 24/42
(52) U.S. Cl. ......................... 524/114; 524/263; 524/265
(58) Field of Search .................... 524/730, 731, 524/188, 265, 263, 114; 427/256, 284, 287; 428/57, 47, 48, 49, 50, 45, 522, 447, 448

(56) References Cited

U.S. PATENT DOCUMENTS

| 4,077,932 | 3/1978 | Columbus | 524/114 |
| 4,818,779 | * 4/1989 | Witucki et al. | 524/188 |
| 5,004,769 | 4/1991 | Loth et al. | 524/43 |
| 5,100,955 | * 3/1992 | Pons et al. | 524/832 |
| 5,118,732 | 6/1992 | Loth et al. | 524/43 |
| 5,124,384 | 6/1992 | Goldstein | 524/169 |
| 5,134,180 | 7/1992 | Loth et al. | 524/43 |
| 5,412,015 | 5/1995 | Sommer et al. | 524/425 |
| 5,541,253 | 7/1996 | Dunaway et al. | 524/832 |
| 5,852,095 | * 12/1998 | Yamauchi et al. | 524/260 |

FOREIGN PATENT DOCUMENTS

| 29611347 | 10/1996 | (DE) . |
| 0010000 | 4/1980 | (EP) . |
| 0199921 | 12/1986 | (EP) . |
| 0219796 | 4/1987 | (EP) . |
| 303071 | 2/1989 | (EP) . |
| 0339427 | 11/1989 | (EP) . |
| 0423613 | 4/1991 | (EP) . |
| 0590660 | 4/1994 | (EP) . |
| 687317 | 11/1996 | (EP) . |

OTHER PUBLICATIONS

Derwent Abstract corresponding to EP 0219796 (#87–116869), Apr. 1987.
Derwent Abstract corresponding to EP 0199921 (#86–272943), Dec. 1986.
Derwent Abstract corresponding to DE 29611347 (#96–426527), Oct. 1996.
English Derwent Abstract corresponding to EPO 303 071, Feb. 1989.
English Derwent Abstract corresponding to EPO 687 317, Nov. 1996.

* cited by examiner

*Primary Examiner*—Paul Thibodeau
*Assistant Examiner*—D. Lawrence Tarazano
(74) *Attorney, Agent, or Firm*—Burgess, Ryan & Wayne

(57) ABSTRACT

The invention relates to jointing compounds which are based on vinyl ester-ethylene copolymers or on acrylate polymers in the form of their aqueous dispersions or of water-redispersible powders with, if desired, other additives, such as fillers, plasticizers, thickeners, dispersants, antifoams, preservatives, pigments and water, wherein the jointing compounds contain from 0.01 to 1.0% by weight, based on the total weight of the jointing compound, of alkylalkoxysilanes of the general formula $SiR_n(OR')_{4-n}$, where n is from 1 to 3, R' represents identical or different alkyl radicals or monoalkyl glycol radicals having from 1 to 8 carbon atoms and R represents identical or different alkyl radicals having from 1 to 8 carbon atoms which may, if desired, be substituted with a halogen such as chlorine, or with ether, ester, amide, hydroxyl, amino, carboxyl, epoxy, carboxylic anhydride or carbonyl groups.

5 Claims, No Drawings

JOINTING COMPOUNDS WITH IMPROVED RESILIENCE

BACKGROUND OF THE INVENTION

1) Field Of The Invention

The invention relates to jointing compounds with improved resilience based on aqueous dispersions or on water-redispersible powders of vinyl ester-ethylene copolymers or acrylate polymers.

2) Background Art

Jointing compounds having dispersions as binders are used in sectors where they are not subjected to prolonged exposure to water. They serve to connect adjacent materials, including those of different types, and in this manner to prevent penetration of harmful substances, such as gases and liquids, in particular water, into the "joint". This prevents damage to the building materials underneath, for example by moisture penetration or frost, which would impair the effectiveness and the permanence of building materials. Besides this, esthetic reasons make it desirable to use jointing compounds for permanent closure of joints.

Jointing compounds having dispersions as binders are predominantly used in connecting joints and expansion joints since, in contrast to jointing compounds based on silicones, they can be counted as relatively plastic systems. It is vital for the permanence of the joint structure that the adhesion to the side of the joint is sufficiently high. The binders are also required to have high resistance to water and weathering when used outdoors.

The binders in jointing compounds having dispersions as binders are vinyl acetate-ethylene copolymers or homo- and copolymers of acrylates. EP-A 303701 discloses joint fillers which are formulated from vinyl acetate-ethylene copolymer, $CaSO_4$ hemihydrate, hollow silicate microspheres and cellulose fibers. EP-A 339427 (U.S. Pat. No. 5,004,769) describes jointing compounds and coating compounds based on aqueous dispersions of acrylate polymers and nonionic cellulose ethers. EP-A 423613 (U.S. Pat. No. 5,118,730) relates to a specific procedure for preparing jointing compounds based on aqueous polymer dispersions and nonionic cellulose ethers, the nonionic cellulose ethers being slurried in small amounts of water before they are added.

An important property for the permanence of jointing compounds, for example outdoors with components which expand and contract as a result of weather conditions, is the ability to absorb stresses resulting from changes in joint width. For this, a requirement is sufficient elasticity, besides good adhesion. In addition, the jointing compound should be able to regain its initial dimensions when joint width reduces, i.e. it should have good resilience. The jointing compounds having dispersions as binders known hitherto and based on acrylate polymers or on vinyl acetate-ethylene copolymers have unsatisfactory resilience, since their Theological behavior is to deform in a manner which is to some extent plastic.

The object was therefore to provide jointing compounds which are based on vinyl ester-ethylene copolymers or on acrylate polymers and which, besides good adhesion and elasticity, are in particular distinguished by high resilience.

SUMMARY OF THE INVENTION

Surprisingly, it has been found that the resilience of jointing compounds based on vinyl ester-ethylene copolymers or on acrylate polymers is markedly improved by adding silanes to the sealant.

The invention provides jointing compounds which are based on vinyl ester-ethylene copolymers or on acrylate polymers in the form of their aqueous dispersions or of water-redispersible powders with, if desired, other additives, such as fillers, plasticizers, thickeners, dispersants, antifoams, preservatives, pigments and water, wherein the jointing compounds contain from 0.01 to 1.0% by weight, based on the total weight of the jointing compound, of alkylalkoxysilanes of the general formula $SiR_n(OR')_{4-n}$, where n is from 1 to 3, R' represents identical or different alkyl radicals or monoalkyl glycol radicals having from 1 to 8 carbon atoms and R [are] represents identical or different alkyl radicals having from 1 to 8 carbon atoms which may, if desired, be substituted with halogens, such as chlorine, or with ether, ester, amide, hydroxyl, amino, carboxyl, epoxy, carboxylic anhydride or carbonyl groups.

DESCRIPTION OF THE PREFERRED EMBODIMENTS

Suitable vinyl ester-ethylene copolymers or acrylate polymers are commercially available in the form of their aqueous dispersions or of water-redispersible powders. The preparation of these dispersions and dispersible powders is known from the literature to the person skilled in the art; in a method based on that described in EP-B 687317, for example, it is possible to proceed with emulsion polymerization of vinyl ester polymers or acrylate polymers, with spray drying if desired.

Suitable vinyl ester-ethylene copolymers generally contain from 5 to 50% by weight of ethylene, based on the total weight of the copolymer. Suitable vinyl esters are vinyl esters of an alkylcarboxylic acid having from 1 to 12 carbon atoms or mixtures of these, preferably vinyl acetate. Suitable acrylate polymers are homo- and copolymers of acrylates of alcohols having from 1 to 8 carbon atoms, in combination with styrene if desired. Particular preference is given to vinyl acetate-ethylene copolymers having from 5 to 50% by weight of ethylene.

The jointing compound generally contains from 5 to 80% by weight of vinyl ester-ethylene copolymer or acrylate polymer, based on the total weight of the jointing compound, preference being given to amounts of from 5 to 50% by weight in jointing compounds containing fillers or from 50 to 80% by weight in transparent jointing compounds.

Preferred alkylalkoxysilanes $SiR_n(OR')_{4-n}$, where n is from 1 to 3, are those in which R' are identical and are methyl or ethyl radicals and R are identical or different and are methyl, ethyl or propyl radicals, substituted with chlorine, with an $N_2$— or with a glycidoxy group.

Examples of these are trimethylethoxysilane, dimethyldiethoxysilane, methyltriethoxysilane, methyltrimethoxysilane, chloropropyltrimethoxysilane, amino-ethylaminopropyltrimethoxysilane, aminoethylaminopropyl-triethoxysilane, aminopropylaminoethylmethyldimethoxysilane and glycidoxypropyltriethoxysilane. The alkylalkoxysilanes mentioned are obtainable commercially or have preparations known to the person skilled in the art, for example from Houben-Weyl, Methoden der organischen Chemie (Methods of Organic Chemistry), Vol. E20, Georg Thieme Verlag, Stuttgart, 1987.

The alkylalkoxysilanes $SiR_n(OR')_{4-n}$ are preferably used in an amount of from 0.05 to 0.2% by weight, based on the total weight of the jointing compound.

Besides the constituents mentioned, the jointing compounds mentioned may also contain other additives, such as fillers, plasticizers, thickeners, dispersants, antifoams, preservatives, pigments and, if dispersible powders are used, further amounts of water.

Jointing compounds usually contain from 10 to 60% by weight, based on the total weight of the jointing compound, of one or more fillers. Transparent jointing compounds are prepared without any proportion of filler. Examples of fillers are calcium carbonate, titanium dioxide, baryte or light spar. If plasticizers are used, their proportion is generally from 5 to 15% by weight, based on the total weight of the jointing compounds. Examples of plasticizers are modified petroleum resins or chloroparaffins. The thickeners used are generally water-soluble polymers, such as polyvinyl alcohols or cellulose ethers. An example of an inorganic thickener is fine-particle silicic acid. The proportion of the thickeners here is generally from 0.1 to 2% by weight of the entire jointing compound.

Other additives which are used, generally in proportions of from 0.05% to 3.0% by weight, based on the total weight of the jointing compound, are dispersants, antifoams, preservatives and pigments. These additives are commercially available products which are known to the person skilled in the art and therefore do not require further explanation.

To prepare the jointing compound, the alkylalkoxysilanes and the additives which, if desired, are admixed with the aqueous dispersion of the vinyl esterethylene copolymer or acrylate polymer. If the vinyl esterethylene copolymer or acrylate polymer is used as dispersible powder, water is generally firstly used to prepare a redispersion into which the other constituents are stirred.

The novel jointing compounds give joints which are distinguished not only by improved resilience, but also by higher mechanical strength, for example breaking strength.

The following examples give further explanation of the invention.

EXAMPLES 1 to 4

The constituents mentioned in Table 1 respectively were intensively mixed in a vacuum mixer in the amounts given in Table 1.

The vinyl acetate-ethylene copolymer was used in the form of an aqueous dispersion (solids content 60%, pH=5, viscosity at 23° C.=6000 mPas) (trade name Vinnapas LL 870 from Wacker-Chemie).

The alkylalkoxysilane used was a glycidoxypropyltriethoxysilane (silane GF 82 from Wacker-Chemie).

The additives used were:
Modified $C_9$-petroleum resin (plasticizer, trade name Necires EPX-L)
Polymeric plasticizer (trade name Plasticizer WP 1)
Dispersant (trade name Dispex N 40)
Preservative (trade name Parmetol DF 12)
Titanium dioxide filler (trade name Kronos 2059)
Calcium carbonate filler I (trade name Omyacarb 5-GU)
Calcium carbonate filler II (trade name Durcal 5)

EXAMPLES 5 to 8

The constituents mentioned in Table 2 respectively were intensively mixed in a vacuum mixer in the amounts given in Table 2.

The vinyl acetate-ethylene copolymer was used in the form of an aqueous dispersion (solids content 65%; pH=5, viscosity at 23° C.=6000 mPas) (trade name Vinnapas LL 6078 from Wacker-Chemie).

The alkylalkoxysilane used was a glycidoxypropyltriethoxysilane (Silane GF 82 from Wacker-Chemie).

The additives used were:
Polymeric plasticizer (trade name Plasticizer WP 1)
Dispersant (trade name Dispex N 40)
Preservative (trade name Parmetol DF 12)
Titanium dioxide filler (trade name Kronos 2059)
Calcium carbonate filler (trade name Omyacarb 5-GU)

Performance Test:

Resilience:
The resilience was determined according to DIN 52458, using an aluminum test body after 50% expansion over the time period given in the tables.

Breaking strength:
The breaking strength was determined after storage for 28 days under standard conditions of temperature and humidity, and using the DIN 53504 tensile test and an extension rate of 10 mm/min on an Instron tensile machine.

The results of the performance tests are given in Tables 1 and 2. Examples 1, 3 and 5 are comparative examples. Comparison of the examples with the comparative examples shows that the alkylalkoxysilane-modified jointing compounds have markedly better resilience and higher breaking strength.

TABLE 1

| Example | 1 | 2 | 3 | 4 |
| --- | --- | --- | --- | --- |
| Polymer dispersion | 700 | 700 | 700 | 700 |
| Plasticizer | 105 | 105 | — | — |
| Polymeric plasticizer | — | — | 100 | 100 |
| Dispersant | 8 | 8 | 8 | 8 |
| Preservative | 2 | 2 | 2 | 2 |
| Ammonia | 1.5 | 1.5 | 1.5 | 1.5 |
| $TiO_2$ filler | 20 | 20 | 30 | 30 |
| $CaCO_3$ filler I | 1200 | 1200 | — | — |
| $CaCO_3$ filler II | — | — | 1200 | 1200 |
| Alkylalkoxysilane | — | 3.5 | — | 7 |
| Resilience in % after 24 h | 44.3 | 70.7 | 56.9 | 76.8 |
| Breaking strength (N/mm$^2$) | 0.02 | 0.11 | 0.01 | 0.08 |

TABLE 2

| Example | 5 | 6 | 7 | 8 |
| --- | --- | --- | --- | --- |
| Polymer dispersion | 680 | 680 | 680 | 680 |
| NaOH (20%) | 2 | 2 | 2 | 2 |
| Polymeric plasticizer | 105 | 105 | 105 | 105 |
| Dispersant | 10 | 10 | 10 | 10 |
| Preservative | 2 | 2 | 2 | 2 |
| $TiO_2$ filler | 30 | 30 | 30 | 30 |
| $CaCO_3$ filler | 1200 | 1200 | 1200 | 1200 |
| Alkylalkoxysilane | — | 0.68 | 1.36 | 2.04 |
| Resilience in % after 1 h | 18 | 27.8 | 38.2 | 45.3 |
| Resilience in % after 24 h | 28.3 | 34.7 | 51.2 | 61.5 |

What is claimed is:
1. A jointing compound for the permanent closure of joints and having the ability to expand and contract with changes in joint width as a result of weather conditions, said compound consisting essentially of jointing compound additives and at least one binder consisting of vinyl ester-ethylene copolymers in the form of their aqueous dispersions or of water-redispersible powders optionally with other additives, wherein the vinyl ester-ethylene copolymers contain from 5 to 50% by weight of ethylene based on the total weight of the copolymer, wherein the vinyl ester is a vinyl ester of an alkylcarboxylic acid having from 1 to 12 carbon atoms or mixtures thereof, and wherein the jointing compounds contain from 0.01 to 1.0% by weight, based on the total weight of the jointing compound, of alkylalkoxysilanes of the general formula $SiR_n(OR')_{4-n}$ where n is 1 to 3, R' represents identical or different alkyl radicals or monoalkyl glycol radicals having 1 to 8 carbon atoms and R represents identical or different alkyl radicals having 1 to 8 carbon atoms optionally substituted with chlorine or a glycidoxy group.

2. The jointing compound of claim 1 wherein the vinyl ester is vinyl acetate.

3. A jointing compound as claimed in claim 1, wherein the alkylalkoxysilanes $SiR_n(OR')_{4-n}$ are present in an amount of from 0.05 to 0.2% by weight, based on the total weight of the jointing compound.

4. A jointing compound as claimed in claim 1, wherein the alkylalkoxysilanes $SiR_n(OR')_{4-n}$ present, where n is from 1 to 3, are those in which the R's are identical and are methyl or ethyl radicals and R' is identical or different and represents methyl, ethyl or propyl radicals, optionally substituted with chlorine, or with a glycidoxy group.

5. The jointing compound of claim 1 wherein the other additives are selected from the group consisting of fillers, plasticizers, thickeners, dispersants, antifoams, preservatives, pigments and water.

* * * * *